United States Patent [19]

Keslar et al.

[11] 4,073,986
[45] Feb. 14, 1978

[54] LAMINATED GLAZING UNIT WITH COMPOSITE INTERLAYER

[75] Inventors: Leroy D. Keslar, Natrona Heights; James E. Vensel, New Kensington, both of Pa.

[73] Assignee: PPG Industries, Inc., Pittsburgh, Pa.

[21] Appl. No.: 577,248

[22] Filed: May 14, 1975

[51] Int. Cl.² .................... B32B 17/10; B32B 27/40; B32B 27/42

[52] U.S. Cl. ..................... 428/38; 52/208; 219/203; 219/522; 428/424; 428/425; 428/430; 428/192; 428/334; 428/339

[58] Field of Search ............... 428/424, 38, 430, 425, 428/156, 245, 334, 339, 192, 209; 52/208

[56] References Cited

U.S. PATENT DOCUMENTS

| | | | |
|---|---|---|---|
| 3,081,205 | 3/1963 | Shorr | 52/208 |
| 3,410,739 | 11/1968 | Oncutt | 428/38 |
| 3,458,388 | 7/1969 | Moynihan | 428/424 |
| 3,538,055 | 11/1970 | Camilleri et al. | 428/424 |
| 3,582,455 | 6/1971 | DeLap et al. | 428/430 |
| 3,703,425 | 11/1972 | Delmonte et al. | 156/245 |

FOREIGN PATENT DOCUMENTS 782,333  10/1972  Belgium.

*Primary Examiner*—Ellis Robinson
*Attorney, Agent, or Firm*—Edward I. Mates

[57] ABSTRACT

A laminated glass-plastic glazing unit suitable for aircraft is disclosed. The unit comprises a pair of sheets of rigid transparent material such as glass or different sizes and an integral interlayer of thermoplastic material having a higher coefficient of thermal expansion than the sheets of rigid transparent material. The interlayer is preponderantly plasticized polyvinyl butyral and integral therewith between at least one of said rigid sheets and said interlayer is a thin layer of polyurethane to reduce the tendency of the interlayer to pull chips from one or both of the rigid sheets when the unit is exposed to extremely low temperatures while in flight in high-flying aircraft. A continuous polyurethane layer may be provided between each rigid sheet and the polyvinyl butyral interlayer or may be provided between only the rigid sheet more likely to be damaged and the polyvinyl butyral in combination with parting material interposed between the other rigid sheet less likely to be damaged and the polyvinyl butyral at or adjacent the marginal portion where the polyvinyl butyral and the other rigid sheet are integral with one another. An adhesion promoter may be provided at an interface between the polyurethane layer and its adjacent rigid sheet.

14 Claims, 3 Drawing Figures

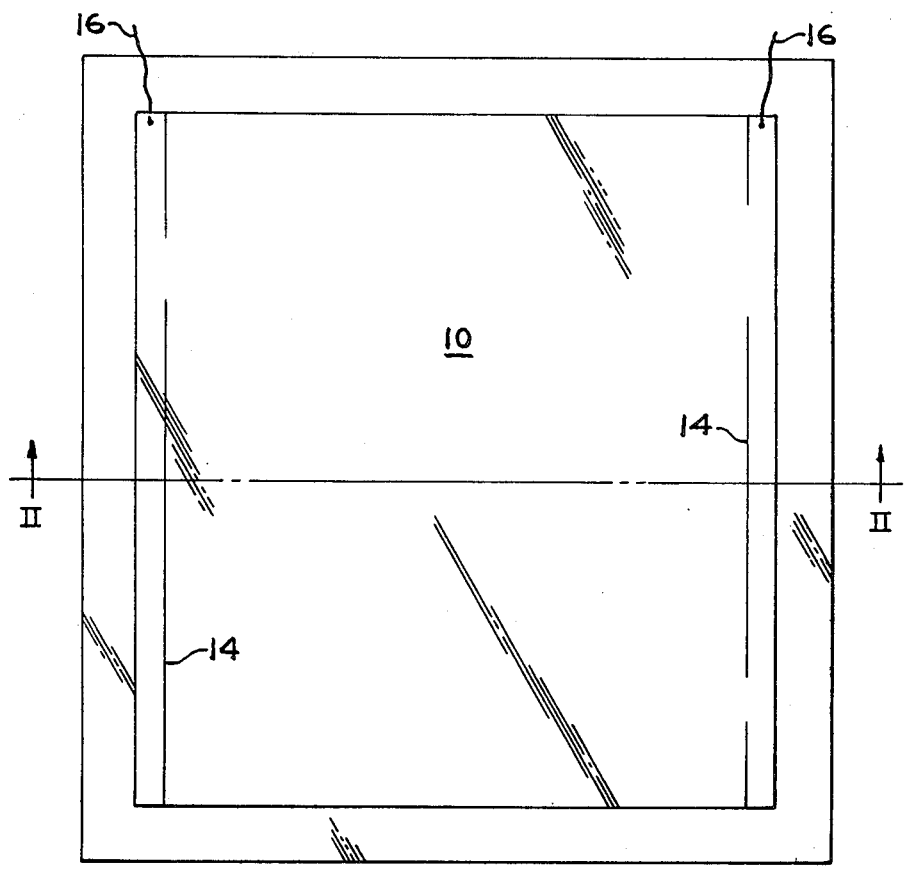
Fig.1
Fig.2
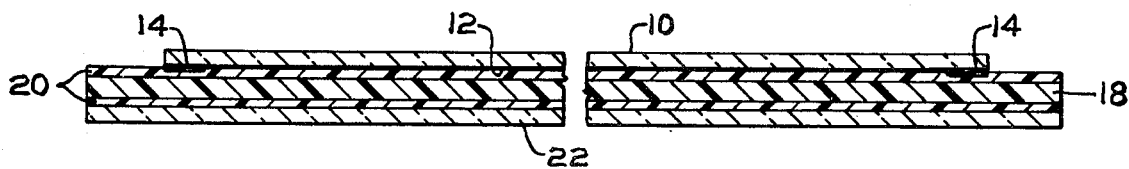
Fig.3
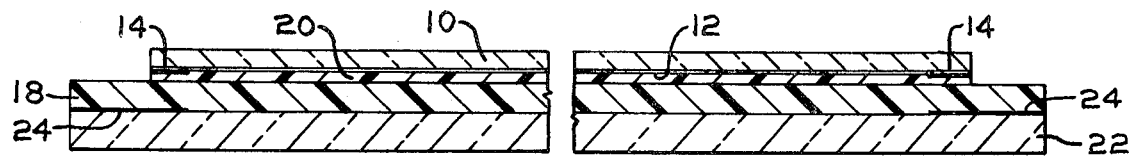

LAMINATED GLAZING UNIT WITH COMPOSITE INTERLAYER

BACKGROUND OF THE INVENTION

1. Field of the Invention

The present invention relates to laminated safety glass glazing units of the type that are normally used in aircraft. A typical aircraft window is a laminated unit comprising a cover plate, an interlayer and a pressure plate. The cover plate is usually an outer glass sheet having a transparent electroconductive coating on its inner surface and a pair of bus bars mounted along longitudinal edges of said inner surface with a lead wire connecting each bus bar to an electric terminal, which, in turn, is connected to a source of potential through a switch in order to provide a potential difference between the bus bars. Electrical energy applied across the bus bars is transmitted through the transparent electroconductive coating to heat the cover plate sufficiently to remove fog or even ice that forms on the outer surface of the cover plate, and hence, the electrical circuit that includes the bus bars and the transparent electroconductive coating serves as a defogging or deicing device.

The pressure plate is usually an inner glass sheet that is usually both larger and thicker than the cover plate, with its marginal portion beyond the margin of the cover plate held in pressurized relation against the frame in which the glazing unit is installed. The interlayer is integral with both the cover plate and the pressure plate and is usually larger than the pressure plate and is composed of a thermoplastic resin. The interlayer in usually reinforced by a metal frame embedded therein that extends around the marginal portion of the unit. A reinforcing frame surrounds the pressure plate. Bolt holes in the metal frame and in the reinforcing frame are aligned with holes along the marginal portion of the frame in which the unit is installed in an aircraft. Thus, aircraft windows or units are attached to and held against the frame of the aircraft about their marginal portion only.

Aircraft windows are normally exposed to severe temperature variations in use. At high altitudes, the outer surface is exposed to low temperature and low pressure, whereas the coated surface of the cover plate is at the elevated temperature of the coating and the inner surface of the pressure plate, that is the surface of the pressure plate exposed to the interior of the aircraft, is exposed to the pressurized condition and the moderate temperature within the aircraft. The interlayer has a higher coefficient of thermal expansion than the glass sheets that are included in the unit. Hence, the interlayer tends to contract more rapidly than the glass during exposure to the low temperatures at high altitudes when the aircraft is in flight. This difference in contraction causes the glass to be stressed as the plastic interlayer tends to shrink away from the portion of the cover plate that contains the bus bars and from the extended portion of the pressure plate beyond the edge of the face plate. Furthermore, additional stresses arise from the pressure differential between the pressurized cabin and the lower pressure outside the aircraft, from impact with objects in flight, from other local high stress points resulting from mechanical or thermal stresses due to non-uniform application of adhesive used to bond adjacent portions of the panel to one another and to the frame, from voids in the adhesive, from locally applied loads, from non-uniformity of electroconductive coating of the defogging device when the latter is operated, from thermal stock, and from thermal gradients due to speed, altitude or the manner of operating the aircraft.

Whatever the causes of the stresses, the fact that the interlayer tends to contract more rapidly than the glass sheets enhances these local stresses and causes the glass to be additionally stressed where the plastic is adhered to the glass sheets, particularly around the marginal portion thereof. This difference in thermal contraction results in the plastic interlayer tending to shrink away from the extended marginal portion of the glass sheets and results in chips formed on the glass surface. This tendency to chip is known in the art as "cold chipping". Sometimes these stresses are so great as to cause complete fracturing of the glass.

"Cold chipping" is especially inherent in laminated windows having rigid transparent panels of unequal size. This inherent characteristic has been attributed to the lack of balance on opposite sides of the plastic interlayer due to the difference in dimensions between the cover plate and the pressure plate. The areas where cold chipping is most likely to occur are in the vicinity of bus bars bonded to the inner surface of the cover plate and in the marginal portion of the pressure plate extending beyond the margin of the cover plate.

2. Description of the Prior Art

The problem of "cold chipping" has been recognized and many solutions have been proposed in the prior art. For example, U.S. Pat. Nos. 2,584,859 and 2,650,976 to Gaiser and to Gaiser et al disclose applying a special tape or strip material as a parting material at the marginal portion of the unit in the non-vision area, particularly over the area where the bus bars are on the glass, to avoid or minimize the possibility of electrode failure or glass failure in such units due to the differential contraction between the plastic interlayer and the portion of the glass sheet on which the bus bar is mounted.

The use of such tapes at the marginal portion is adequate to control cold chipping in units up to a certain size for use at a given low temperature, but when used in larger sized units fails to avoid cold chipping in the portion inward at the given or lower temperatures. Furthermore, parting materials at the marginal portion permits moisture to penetrate within the unit to the polyvinyl butyral unless additional precautions are taken. Moist polyvinyl butyral does not adhere as well as dry polyvinyl butyral. Hence, when such units are exposed to high humidity conditions, the units tend to delaminate.

U.S. Pat. No. 2,758,042 to Richard F. Raymond and Emil A. Fusca discloses incorporating a balancing strip in the interlayer on the side opposite the marginal area of the larger pressure plate that extends beyond the margin of the cover plate in the non-vision area of the unit. This type of unit does not prevent cold chipping in the region inside the frame formed by the balancing unit under severe conditions.

U.S. Pat. No. 2,991,207 to Philip A. Miller discloses slitting the interlayer in spaced relation to the interfacial surface between the glass and the interlayer in the marginal portion of the unit only. Another solution proposed to eliminate cold chipping was to enclose the unit within an electroconductive wire and selectively heat the margin of the unit by radiation from the heated wire.

Such proposals provided some improvement in cold chipping. However, they still left something to be desired in the reduction of "cold chipping," particularly at the lower temperatures experienced by aircraft windows flying at higher elevations than previously.

SUMMARY OF THE INVENTION

According to the present invention, a layer of polyurethane is provided between the plasticized polyvinyl butyral interlayer and at least one of the sheets of rigid material throughout the area wherein the plasticized polyvinyl butyral is integral with said sheet of rigid transparent material. The inner surface of the other sheet of rigid material may also have a layer of polyurethane interposed between it and the plasticized polyvinyl butyral interlayer throughout the area where said interlayer is integral with said other sheet of rigid transparent material or the laminated glazing unit may comprise a layer of polyurethane between one of said sheets of rigid material more susceptible to cold chipping and the plasticized polyvinyl butyral interlayer in combination with any well known means employed to reduce the adhesion of the plasticized polyvinyl butyral interlayer to the marginal portion of the other sheet of rigid material. The polyurethane layer or layers so applied have a transparency to visible light sufficient to permit the polyurethane to extend completely across the vision area of the unit. Therefore, the aircraft glazing unit is composed of continuous layers of different materials of uniform thickness per layer throughout the vision area so that there is uniform optical properties throughout the vision area.

A polyurethane layer is not subject to as much brittleness as has been previously experienced by plasticized polyvinyl butyral in service and therefore the polyurethane layer distorts in shear, thereby reducing the effect of the thermal contraction of the plasticized polyvinyl butyral to cause cold chipping of the adjacent glass sheet of the glazing unit modified in accordance with the present invention. The polyurethane layer must be sufficiently thick to be able to provide shear strength under low temperature conditions contemplated for service of the unit. This minimum thickness depends on the size of the unit and the thickness of the plasticized polyvinyl butyral interlayer and of the glass sheets that comprise the unit. The polyurethane layer must be continuous to avoid any direct bond between plasticized polyvinyl butyral and a glass sheet or a coating or bus bar bonded to a glass sheet.

In a particular embodiment of the invention, where the window is provided with bus bars for heating the electroconductive coating on the cover plate, a polyurethane layer is disposed between the coated inner surface of the cover plate and the plasticizied polyvinyl butyral interlayer. If desired, a second polyurethane layer may also be disposed between the pressure plate and the other surface of the plasticized polyvinyl butyral interlayer.

Adhesion between a polyurethane layer and an adjacent cover plate or adjacent pressure plate may be maintained under humid conditions when the cover plate or pressure plate is composed of glass by applying an adhesion promoter to a glass-polyurethane interfacial surface or incorporating in the polyurethane composition a small proportion of adhesion promoting composition as is well known in the art of laminating polyurethane to glass.

Hence, one can expect a laminated glazing unit constructed according to the present invention to have a longer service life than units of the prior art because units according to this invention are less prone to damage from cold chipping or from delamination under high humidity conditions than prior art units.

The present invention will be understood better in the light of a description of illustrative embodiments of the invention that follows. While the embodiments described comprise defogging or deicing devices, it is understood that the present invention is capable of use with laminated glass-polyvinyl butyral units that have no electroconductive defogging or deicing devices by incorporating a continuous polyurethane layer at one or more glass-polyvinyl butyral interfaces. It is also understood that while the embodiments are limited to those having glass sheets as the cover plate and the pressure plate, the present invention is equally adapted for use in a laminated glazing unit having one glass sheet providing one outer face of the unit and a plastic sheet of a well known glass substitute such as acrylics, polycarbonates or other rigid transparent plastics at the other outer face of the unit. In such cases, a continuous layer of polyurethane is interposed between a plasticized polyvinyl butyral interlayer and the glass sheet.

Furthermore, while the illustrative embodiments disclose the use of a continuous polyurethane layer interposed throughout substantially the entire extent of an interface common to the inner surface of an outer glass sheet and a plasticized polyvinyl butyral layer, the invention also contemplates protecting the surface of an intermediate glass sheet of a multiple glass sheet laminated unit from the consequences of direct contact with plasticized polyvinyl butyral as the unit is exposed to extremely low temperatures, by interposing a continuous layer of polyurethane at the interfacial surface, particularly when the intermediate glass sheet is coated with bus bars and a transparent electroconductive coating. In such a case, the polyurethane layer is located between the coated surface and the plasticized polyvinyl butyral interlayer.

DESCRIPTION OF THE DRAWINGS

In the drawings which form part of the aforesaid description and where like reference numbers refer to like structural elements, FIG. 1 is a plan view of a test panel incorporating the essential elements of the present invention:

FIG. 2 is a sectional view taken along the lines 2--2 of FIG. 1, and

FIG. 3 is a secional view similar to that of FIG. 2 of an alternate embodiment of the present invention.

DESCRIPTION OF THE PREFERRED EMBODIMENTS

It is understood that the following description omits many structural elements commonly found in laminating glazing units for aircraft, such as mounting frames, such as those in U.S. Pat. No 3,081,205 to Shorr, electrical terminal blocks and special insulators for lead lines connecting bus bars for the defogging or deicing device of U.S. Pat. No. 3,410,739 to Orcutt, temperature sensing devices, such as those shown in U.S. Pat. No. 3,789,191 to Spindler, reinforcing frames such as those shown in the aforesaid Orcutt and Shorr patents and other structural elements well known in the art.

A typical construction for a laminated glazing unit for aircraft comprises an outer glass sheet or cover plate 10 provided with a transparent electroconductive coating 12 and a pair of bus bars 14 extending along an opposite pair of edges on the inner surface of the cover plate 10, lead wires 16 leading from the bus bars to terminal blocks (not shown), a plasticized polyvinyl butyral interlayer 18 and an inner glass sheet or pressure plate 22 larger in outline than the cover plate 10 with the interlayer 18 integral with the cover pate 10 and extending beyond the margin of the cover plate to be integral on its inner surface with the pressure plate 22.

According to one embodiment of the present invention, a layer of polyurethane 20 is disposed with its outer surface integral with the coating 12 and bus bars 14 on the inner surface of the cover plate 10 and its inner surface integral with the adjacent surface of the plasticized polyvinyl butyral interlayer 18. As seen in FIG. 2, another layer 20 of polyurethane is interposed between the pressure plate 22 and the surface of the plasticized polyvinyl butyral interlayer 18 that is adjacent to the pressure plate. Preferably, the surface of the plasticized polyvinyl butyral interlayer is press polished prior to laminating with the polyurethane layer or layers.

The thickness of the polyurethane must be sufficient to bear a shear load at cold temperatures of exposure rather than apply stresses of such a magnitude to the glass integral therewith to cause cold chipping. A minimum suggested range of thickness for use in service is about 5 mils (0.127 millimeters) to about 30 mils (0.762 millimeters) depending on the size and construction of the unit. Since polyurethane is more expensive than plasticized polyvinyl butyral, its maximum thickness is limited by practical purposes.

The glass sheet that is subject to cold chipping in service is most likely to be the coated outer cover plate, although there is some tendency for cold chipping to result in the marginal portion of the pressure plate beyond the margin of the cover plate. In cases where the shape of the unit and the conditions of its service are such that the tendency for cold chipping is sufficiently greater in one glass sheet than the other glass sheet, the unit may include a layer of polyurethane integral with the plasticized polyvinyl butyral interlayer on the side thereof facing the glass sheet more likely to suffer damage from cold chipping in combination with a marginal frame of a tape or a frame of resilient parting material that is less efficient to prevent cold chipping interposed between the marginal portion of the pasticized polyvinyl butyral interlayer and the marginal portion of the glass sheet less likely to damage from cold chipping.

FIG. 3 shows a unit illustrating an alternate embodiment of the present invention that comprises a cover plate 10, a transparent electroconductive coating 12 and a pair of bus bars 14 bonded to the inner surface thereof, a layer of polyyrethane 20 coextensive with cover plate 10 integral with said cover plate, a plasticized polyvinyl butyral interlayer 18, a pressure plate 22 and a frame 24 of parting material, such as silicone tape, rubber tape, friction tape, opaque or transparent Scotch tape, surgical type adhesive tape, polyethylene tape, TEFLON tape, resin impregnated cloth tape or the like, or a frame of a resilient parting material such a polysulfide or synthetic rubber or the like, instead of the second layer of polyurethane as in the first embodiment of FIGS. 1 and 2. It is understood that in the embodiment of FIG. 3, the cover plate 10 is more likely to become damaged in service as a result of cold chipping than the pressure plate 22 and therefore it is important to have the polyurethane layer 20 between the cover plate 10 and the interlayer 18. It is understood that where the outline and construction of the glazing unit and its exposure in service causes the glazing unit to encounter conditions such that the pressure plate rather than the cover plate becomes more susceptible to damage from cold chipping, it is within the teaching of the present invention to provide the unit with a structure having a polyurethane layer located between the pressure plate and the interlayer, and a tape or other parting material frame located between the interlayer and the cover plate.

It is also understood that while the present invention illustrates an interlayer of plasticized polyvinyl butyral, the term "interlayer", as it is contemplated for use of the present invention, may comprise one or more layers of plasticized polyvinyl butyral bonded to one another or made integral to one another with intermediate layers of transparent material of either rigid or flexible nature therebetween. The term "interlayer" as herein contemplated also includes structures comprising rigid plies of coated or uncoated glass or polycarbonate or acrylic or polyester and/or flexible plies of polyurethane, and other esters commonly used as interlayer materials or combinations of rigid and flexible materials within outer plies of plasticized polyvinyl butyral so that the "intelayer" has outer surfaces of plasticized polyvinyl butyral facing a glass surface or a coated glass surface.

The gist of the present invention in its broadest aspect resides in the interposition of a continuous layer of polyurethane between an outer layer of a plasticized polyvinyl butyral interlayer and either the cover plate or pressure plate that is more likely to be damaged by cold chipping in use. When both cover plate and pressure plate are likely to be subjected to such damage in use, a polyurethane layer is interposed between each outer surface of the plasticized polyvinyl butyral interlayer (in its broadest aspects) and both the cover plate on one side and the pressure plate on the other side.

Interlayer Materials For Aircraft Glazing Units

The transparent plastic material of the interlayer of the laminated glazing unit may be polyvinyl acetal such as plasticized polyvinyl butyral resin. Polyvinyl butyral is prepared as recited in U.S. Pat. No. 2,400,957 to Stamatoff, and is commonly used as the interlayer of laminated glass windshields.

Conventionally, polyvinyl acetals, particularly polyvinyl butyral is used in safety-glass laminated, contains a plasticizer. Generally, the plasticizer used is a water-insoluble ester of a polybasic acid and a polyhydric alcohol. Particularly desirable plasticizers for use in the present invention are triethylene glycol di(2-ethyl butyrate), dibutyl sebacate, di(beta-butoxy-ethyl) sebacate and dioctyl phthalate.

Various plasticized polyvinyl acetal resins are described in detail in U.S. Pat. No. 2,372,522. Many well-known plasticizers suitable for use with polyvinyl butyral are also disclosed in U.S. Pat. No. 2,526,728 to Burk et al.

Glass Compositions Suitable For Aircraft Glazing Units

Any well known commercial plate, float or sheet glass composition or any other transparent tempered glass generally used in windows is suitable for use as the outer glass sheet of a laminated windshield. Particularly suitable compositions are those of the soda-lime-silica type which may include or exclude a glass tinting composition such as about one-half percent of iron oxide. The glass sheets are preferably tempered to improve their resistance to breakage. The tempering may be by thermal tempering as taught in U.S. Pat. No. 3,849,100 to Luppino, or chemical tempering as taught in U.S. Pat. No. 3,218,220 to Weber, or liquid quenching as taught in U.S. Pat. No. 3,794,476 to Michalik and Gorman, or submission quenching as taught in U.S. Pat. No. 3,764,403 to Neely.

Polyurethanes Suitable For This Invention

The polyurethanes preferably used for interposition between a glass sheet and a polyvinyl butyral interlayer according to the principles of the present invention can broadly be described as the reaction product of a polyisocyanate and a polyol which upon lamination forms a transparent layer. The polyurethanes may have thermosetting or thermoplastic properties, but preferably exhibit thermoplastic properties. Thus, for example, an organic diisocyanate is reacted with a relatively long chain diol and a curing agent which is usually a monomeric compound having at least two active hydrogens per molecule, as determined by the Zerewitinoff test described in Kohler, J. Am. Chem. Soc., 49, 3181 (1927). Suitable polyisocyanates are organic diisocyanates which include aromatic, aliphatic, cycloaliphatic and heterocyclic diisocyanates. Examples are 2,4- and 2,6- toluylene diisocyanate, 1,4-butane diisocyanate, 1,2-isocyanato-methyl cyclobutane, 4,4'-methylene-bis-(cyclohexyl isocyanate), 1,10-decane diisocyanate, and furfurylidene diisocyanate.

Suitable long chain diols include polyester diols. The polyester diols can be prepared by the polyesterification reaction of an aliphatic dibasic acid or an anhydride thereof with a diol, preferably an aliphatic diol. Suitable aliphatic dicarboxylic acids can be represented by the formula HOOC—R—COOH wherein R is an alkylene radical containing from 2 to 12, and preferably 4 to 8, carbon atoms inclusive, examples of which are adipic, succinic, palmitic, suberic, azelaic and sebacic moieties. Suitable aliphatic diols contain from 2 to 15 carbon atoms, exemplry of which are ethylene glycol, 1,3-propanediol, 1,4-butanediol and 1,6-hexanediol. The average molecular weight of the polyester diol should be between 750 and 5000, preferably between 1000 and 3300. The preferred polyester diol is poly(1,4-butylene adipate having a molecular weight of about 1800 to 2200.

With the thermoplastic polyurethanes the polyisocyanate and the long chain glycol are preferably reacted with a curing agent which has two active hydrogens per molecule. Perferred curing agents are aliphatic diols having from 2 to 15 carbon atoms such as ethylene glycol, 1,3-propane diol, 1,4-butanediol and 1,6-hexanediol. Aminoalcohols and diamines can also be employed. Examples include monoethanolamine and 1,2-ethanediamine.

The thermoplastic polyurethanes can be prepared by pre-reacting the organic diisocyanate (about 4 molar parts) with the mixture of diols (about 1 molar part long chain diol and 2.8 molar parts curing agent) for about 15 minutes at a temperature of from about 100 to about 120° C. and then cooling the reaction mixture to a temperature below about 30° C. in order to interrupt the reaction and produce a thermoplastic product which has free isocyanate groups. The plastic can then be extruded into film or thicker sheet form and thinner films of the required thickness skived from the sheets.

The following Example will serve to illustrate the polyurethane material preferably used in the laminated glazing panels of the present invention. All parts and percentages in said Example are by weight unless indicated to the contrary.

EXAMPLE 1

One mole of a poly(1,4-butylene adipate) polyester having a molecular weight of 1965, a hydroxyl number of 57 and a melting point of 51 and an acid number of 0.5 was dried with agitation in a glass reactor to remove trace amount of water by heating to 100°–105° C. under 3 millimeters of mercury pressure for about 3 hours. The pressure was released while introducing pre-purified nitrogen and anhydrous 1,4-butanediol, (2.71 moles, 0.03% $H_2O$) was added over a one minute period to the agitated mixture of polyester at 93° C., and the mixture heated to 95° C. in 15 minutes. The resulting mixture was homogeneous. To this homogeneous mixture was added over a one minute period 3.71 moles of 4,4'-methylene-bis--(cyclohexyl isocyanate) with a stereoisomer content of 19 to 21 percent trans, trans, 17 to 18 percent, cis, cis, and 62 to 64 percent cis, trans, and containing between 0.27 percent and 0.40 percent monoisocyanate, i.e., "HYLENE W" marketed by E. I. duPont deNemours & Co., Inc. and to which had previously been added 0.280 gram (0.01 percent of the total reactants) of dibutyltin dilaurate catalyst. The butanediol and diisocyanate were at 22° C. and the additions were both made while the reactor was under nitrogen atmosphere. The resulting mixture was rapidly agitated for about one minute during which time the temperature of the mixture rose fom 80° C. to 95° C. The mixture was poured into a dry TEFLON coated reactor which was closed and placed in a 130° C. non-circulating continuous purged nitrogen oven (the temperature of the polymer was approximately 143° C.) for about 2 hours until the reaction amd polyurethane formation was substantially complete. The NCO content of the polymer was 0.07 percent by weight as determined by infrared spectrometry. The resultant semisolid polymer was allowed to cool to room temperature, removed, cut and milled (front roll 82° C. and rear roll 57° C.) ,and calendered om a 3 roll mil (top roll 121° C., middle roll 107° C. and bottom roll 102° C.) into sheets 0.8 millimeters thick. The polymer had an inherent viscosity at 30° C. at a 0.5 percent concentration in N-methyl-2pyrrolidone of about 1.40 before milling and an NCO content of 0.07 percent. The inherent viscosity after calendering was approximately the same (1.41).

Adhesion Promoters for Making Polyurethane Layer Integral With Glass

In some cases, an adhesion promoter may be necessary to adhere a glass ply to a polyurethane ply. Suitable materials include various alkoxy silanes, such as gamma aminopropyltriethoxysilane, sold by Union Carbide Corporation, under the trademark "A-1100" and Dow Corning under the trademark "Z-6020"; and N-(beta-amino ethyl)gamma-aminopropyltrimethoxysilane sold by Union Carbide Corporation under the trademark "A-1120". The promoter may be incorporated into the urethane reactants, applied externally to the sheet material, or preferably aplied to the glass surface. In some cases, an adhesion controlling agent or inhibitor may be necessary such as the alkyl acid phosphates disclosed in U.S. Pat. No. 3,791,914 to Ammons and Dufala. Particularly preferred are methyl acid phosphate and stearyl acid phosphate, which have been observed to effect a desirable controlled adhesion with excellent diaphragm action and glass retention when a laminate is broken. It has been found that when laminates are prepared by the cast-in-place method, generally, an adhesion inhibitor is necessary as this method produces laminates in which the urethane is quite strongly adhered to the glass. A promoter may or may not be necessary depending upon the polymer employed when the polyurethane is extruded and/or calendered into a sheet such as when made by the "one-step" bulk poluymerization method. The inhibitors are generally added to the urethane reactants although in some cases they may be coated on the sheet material or glass layer. Only a minor amount of adhesion controlling agent is required, if at all, such as from about 0.00001 to about 0.1 percent.

EXAMPLE 2

A pair of glass sheets of matching contour conforming to the cover plate and the pressure plate of a laminated aircraft glazing unit was selected. One of the glass sheets in the pair was coated on its concave surface with strips of a ceramic silver frit consisting essentially of 70 percent silver, 12.5 percent French fat oil, 7.5 percent turpentine, 7.5 percent PbO, 1 percent $B_2O_3$ and 1.5 percent $SiO_2$ by weight, along its opposite edge portions, heated to about 1250° F. (680° C.) and coated with a film forming composition consisting essentially of 100 grams of dibutyl tin oxide, 45 grams of ammonium acetate, 68 grams of 20 percent HF in 3A alcohol (density 0.83 grams per cc) and 55 grams of n-propanol applied at a rate of 10 cc per 3 seconds using a Binks Model 21 spray gun.

After cooling the coated sheet, an adhesive promoter consisting essentially of n-(beta-amino ethyl) gamma-aminopropyltrimethoxysilane sold by Union Carbide Corporation under the trademark of "A-1120" was dissolved in a 50 percent by weight isopropanol-50 percent water solution in a 1 percent by weight concentration. The solution was sprayed on the coated surface of the glass sheet to be included in the aircraft glazing unit as the cover sheet and dried for approximately 10 minutes at room temperature.

A frame of parting material tape was applied to the inner surface of the larger glass sheet to be used as a pressure plate.

An assembly was then formed comprising the coated glass sheet, the preformed polyurethane sheet, a plasticizied polyvinyl butyral sheet, and the other glass sheet to be laminated to the plasticized polyvinyl butyral sheet. The sheets in the assembly were oriented so that one surface of the polyurethane sheet faced the surface of the glass sheet treated with said adhesive promoting composition and the opposite surface of the polyurethane sheet faced the plasticized polyvinyl butyral interlayer and the latter faced the surface of the other glass sheet provided with the border of parting material.

The assembluy was wrapped in plastic and the plastic-wrapped assembly inserted in a so-called "polymar" bag of the type disclosed in U.S. Pat. No. 3,311,517 to Leroy D. Keslar and John Rankin. The bag comprises an outer ply of polyethylene glycol terephthalate and an inner ply of polyethylene bonded thereto. The bag was inserted within a second bag of the same material and the unit evacuated and sealed. The sealed unit was placed in an oil autoclave and subjected to a pressure of 200 pounds per square inch at 275° F. for 45 minutes. The unit was then cooled to room temperature while maintaining an elevated pressure. The pressure was then reduced.

The assembly was removed from the autoclave and the bags and plastic wrapping removed from the assembly.

The resulting windshield had excellent optical properties and was clear and exhibited excellent transmission to visible light. It was sold and used in aircraft in flight, having passed standard acceptance tests to which PPG Industries, Inc. subjects its production units such as the thermal shock test described hereafter, an overvoltage test to determine if the unit is properly insulated from ground and an inspection under polarized light while the unit is subjected to 150 percent of its operating voltage to insure that the transparent electroconductive coating is free of scratches and voids.

EXAMPLE 3

In addition to the fabrication of the windshields of Example 2, four flat test samples were laminated for testing. Each test laminate consisted essentially of a first sheet of glass 3/16 inch (4.8 millimeters) thick and 10 inches wide (254 millimeters) by 24 inches long (610 millimeters) coated with a tin oxide coating and silver-ceramic bus bars applied as in Example 2 with the bus bars extending along the longer edge portion of the coated glass sheet. The laminate also included in successive layers, a sheet of polyurethane 0.030 inch thick (0.76 millimeter) against the coated surface of the first glass sheet, a sheet of plasticized polyvinyl butyral 0.300 inch thick (7.62 millimeters), a second sheet of polyurethane 0.030 inch thick (0.76 millimeter), which in turn was laminated to the other side of the sheet of polyvinyl butyral and a glass sheet 3/16 inch thick (4.8 millimeters) bonded to the second sheet of polyurethane. The sheets other than the first glass sheet were 11 inches (279 millimeters) long by 25 inches (635 millimeters) wide. The laminated test samples also contained an adhesion promoter at each glass-polyurethane interface. The adhesion promoter was 1 percent N-(beta-amino ethyl) gamma-aminopropyl-trimethoxysilane ("A-1120") dissolved in a solution of water and isopropanol containing equal parts by weight. The samples were subjected to the following test schedule and successfully survived, thus indicating their superiority to laminated prior art units of the same dimensions provided with tapes of parting material along the marginal portions only instead of the continuous polyurethane layers, based on past experience with tests performed on prior art laminated units.

The test schedule for the four test samples involved 17 thermal shock tests followed by one week exposure test to 100 percent relative humidity at 125° F. (51.7° C.) followed by two thermal shock tests, followed by another of said one week exposure tests followed by two more thermal shock tests, followed by 100 hours exposure to ultraviolet light in an enclosed cabinet followed by two more thermal shock tests. Each thermal shock test included cooling the test smaple to −65° F. (−54.6° C.), holding for 2 hours at that cold temperature, then applying sufficient voltage to obtain a heating concentration of 7 watts per square inch (1.1 watts per $cm^2$) until the outer surface of the first glass sheet reaches 135° F. (57.2° C.).

The samples were examined after each test. No glass chipping or delamination or other signs of degradation were observed. In contrast, prior art units normally fail prior to completion of this test regimen.

EXAMPLE 4

Other production units such as a pilot window for the DC-9 containing outer and inner glass sheets having bus bars and transparent electroconductive coatings on their inner surfaces, an intermediate glass sheet with plasticized polyvinyl butyral interlayers between adjacent glass sheets and a thin layer of polyurethane at the interface between the plasticized polyvinyl butyral interlayer and the outer coated glass sheet, with conventional parting material frames on the other interfacial surfaces were fabricated, passed pressure cycling tests from 0 to 14 PSI (68 Kg/cm$^2$) at temperatures varying from $-100°$ F. ($-33°$ C.) to 120° F. (49° C.) for three weeks without interlayer delamination or failure of the glass sheets, and is still in serviceable condition.

EXAMPLE 5

Windshields for the Grumman Gulfstream which are similar in configuration to the pilot windows of Example 4, except that the inmner glass sheet is not coated, were also fabricated and successfully tested.

EXAMPLE 6

A large curved windshiled for the Boeing B—747 similar in construction to that of Example 5 except that the transparent electroconductive coating on the inner surface of the outer glass sheet was a tin-indium coating applied by cathode sputtering to form an outer sheet of NESATRON coated glass containing a polyurethane layer 0.8 millimeter thick against the coating passed the aforesaid standard acceptance tests of PPG Industries, Inc. and is presently in service.

The form of the invention shown and described herein represents an illustrative preferred embodiment and variations thereof. It is understood that various changes may be made without departing from the gist of the invention as defined in the claimed subject matter which follows.

We claim:

1. A laminated glazing unit comprising an outer sheet of transparent rigid material, an inner sheet of transparent rigid material, at least one of said sheets being a glass sheet likely to be damaged by cold chipping in service, an interlayer having a plasticized polyvinyl butyral surface integral with said glass sheet, and a continuous layer of transparent polyurethane disposed between said glass sheet and said plasticized polyvinyl butyral interlayer and integral therewith throughout substantially the entire extend common to said glass sheet and said interlayer.

2. A laminated glazing unit as in claim 1, wherein both said sheets of rigid transparent material are glass sheets and said layer of polyurethane is disposed between said outer glass sheet and said plasticized polyvinyl butyral interlayer.

3. A laminated glazing unit as in claim 1, wherein both said sheets of rigid transparent material are glass sheets and said layer of polyurethane is disposed between said inner glass sheet and said plasticized polyvinyl butyral interlayer.

4. A laminated glazing unit as in claim 1, wherein both said sheets of rigid transparent material are glass sheets and said outer glass sheet is smaller than said inner glass sheet and said layer of polyurethane is interposed between said outer glass sheet and said plasticized polyvinyl butyral interlayer and is integral with said outer glass sheet throughout substantially the entire extent thereof.

5. A laminated glazing unit as in claim 4, further including a transparent electroconductive coating bonded to the inner surface of said outer glass sheet and a pair of bus bars electrically connected to an opposite pair of edges of said coating.

6. A laminated glazing unit as in claim 5, further including a frame of parting material for reducing chill cracking interposed between the marginal portion of said inner glass sheet and said plasticized polyvinyl butyral interlayer.

7. A laminated glazing unit as in claim 4, further including another layer of polyurethane between said plasticized polyvinyl butyral interlayer and said larger inner glass sheet.

8. A laminated glazing unit as in claim 7, wherein said plasticized polyvinyl butyral interlayer is at least as large as said inner glass sheet and said another layer of polyurethane is integral with said inner glass sheet and said interlayer throughout substantially the entire extent thereof.

9. A laminated glazing unit as in claim 1, further including an adhesive bonding said polyurethane layer to said one glass sheet.

10. A laminated glazing unit as in claim 2, further including an adhesive bonding said polyurethane layer to said outer glass sheet.

11. A laminated glazing unit comprising a plurality of glass sheets, a transparent electroconductive coating on a surface of at least one of said glass sheets and a pair of bus bars electrically connected to an opposite pair of edges of said coating, an interlayer of plasticized polyvinyl butyral integral with said coated surface and a continuous layer of polyurethane of substantially uniform thickness throughout disposed between said coated surface and said interlayer of polyvinyl butyral throughout substantially the entire extent thereof.

12. A laminated glazing unit comprising a plurality of glass sheets, an interlayer of plasticized polyvinyl butyral intermediate each adjacent pair of said glass sheets, and a continuous layer of polyurethane having a substantially uniform thickness of at least about 5 mils (0.127 millimeter) disposed in integral relation between each of said glass sheets subject to chill cracking on exposure of the unit to cold temperatures and its adjacent plasticized polyvinyl butyral interlayer.

13. A laminated glazing unit as in claim 12, wherein a continuous layer of polyurethane having a substantially uniform thickness of at least about 5 mils (0.127 millimeter) is interposed in integral relation between each interlayer and eah of said glass sheets.

14. A laminated glazing unit as in claim 12, further including an adhesive bonding each continuous layer of polyurethane to said glass sheet in integral relation therewith.

* * * * *

UNITED STATES PATENT AND TRADEMARK OFFICE
CERTIFICATE OF CORRECTION

PATENT NO. : 4,073,986
DATED : February 14, 1978
INVENTOR(S) : Leroy D. Keslar and James E. Vensel It is certified that error appears in the above-identified patent and that said Letters Patent are hereby corrected as shown below:

Column 4, line 56, after "those", please insert --shown--.
Column 5, line 5, "pate" should be --plate-- (first occurrence).
Column 5, line 52, "polyyrethane" should be --polyurethane--.
Column 7, line 39, "exemplry" should be --exemplary--.
Column 7, line 44, "adipate" should be --adipate)--.
Column 8, line 41, "om" should be --on--.
Column 8, line 61 "aplied" should be --applied--.
Column 9, line 8, "poluymerization" should be --polymerization--.
Column 9, line 56, "assembluy" should be --assembly--.
Column 10, line 32, after "sheet of", please insert --plasticized--.
Column 10, line 56, after "100 hours", please insert --in an oven at 200°F. (93.3°C.) followed by 2 more thermal shock tests, followed by 100 hours--.
Column 10, line 59, "smaple" should be --sample--.
Column 11, line 22, "inmner" should be --inner--.
Column 11, line 26, "windshiled" should be --windshield--.
Column 11, line 52, "extend" should be --extent--.
Column 12, line 58, "eah" should be --each--.

Signed and Sealed this

Eleventh Day of July 1978

[SEAL]

Attest:

RUTH C. MASON
*Attesting Officer*

DONALD W. BANNER
*Commissioner of Patents and Trademarks*